2,304,693

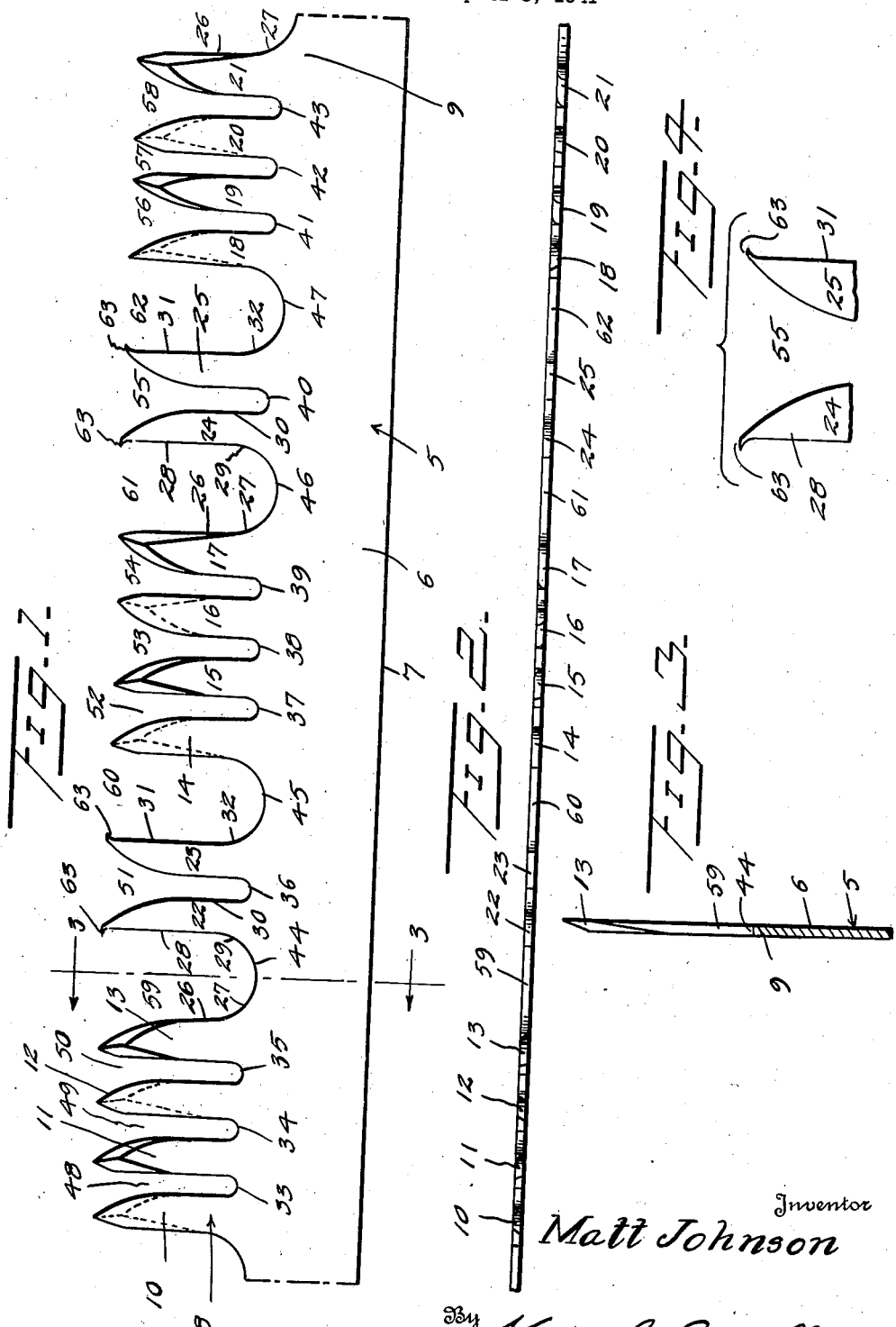
Dec. 8, 1942.    M. JOHNSON    2,304,693
SAW
Filed April 8, 1941
Inventor
Matt Johnson
By Kimmel & Crowell
Attorneys Patented Dec. 8, 1942

UNITED STATES PATENT OFFICE 2,304,693

SAW

Matt Johnson, Naselle, Wash.

Application April 8, 1941, Serial No. 387,500

1 Claim. (Cl. 143—133)

This invention relates to a saw, but more particularly to the form of the cutting units thereof.

A cutting unit in accordance with this invention is designed primarily for cross-cut and falling saws, but it is to be understood that it is for use in any connection for which it may be found applicable.

The invention aims to provide, in a manner as hereinafter set forth, a cutting unit forming an element of a saw which is so constructed when the saw is used as to expeditiously cut logs or other wooden bodies for which it is adapted.

The invention further aims to provide, in a manner as hereinafter set forth, a saw including raker teeth so formed and arranged to thereby provide for the quick cutting of logs or other wooden bodies.

The invention further aims to provide, in a manner as hereinafter set forth, a saw including raker teeth capable of being easier to file than the raker teeth now generally employed and requiring less time for filing than the period required for filing the general form of raker teeth now employed.

The invention further aims to provide, in a manner as hereinafter set forth, a saw including raker teeth whereby it is not necessary to employ a three-cornered file for sharpening them.

The invention further aims to provide, in a manner as hereinafter set forth, a saw including raker teeth whereby it is not necessary, when sharpening to file the entire wall or edge of the gullet or recess between them, or use a three-cornered file as the teeth are so formed and arranged that when sharpening it only requires a filing action on the tips thereof with a flat file.

The invention further aims to provide, in a manner as hereinafter set forth, a saw having the gullets of the desired size arranged between the teeth to take care of the shavings when the saw is drawn in either direction.

The invention further aims to provide, in a manner as hereinafter set forth, a saw of the type referred to, which is simple in its construction and arrangement, strong, durable, compact, thoroughly efficient when used and comparatively inexpensive to manufacture.

Embodying the aims aforesaid and others which may hereinafter appear, the invention consists of the novel construction, combination and arrangement of parts as will be more specifically described and illustrated in the accompanying drawing, wherein is shown an embodiment of the invention, but it is to be understood that changes, variations and modifications may be resorted to which fall within the scope of the invention as claimed.

A saw in accordance with this invention is to include two or more endwise aligned like cutting units, the number of such units depending upon the length of the saw. The drawing to be referred to will illustrate the form of the cutting unit in accordance with this invention.

In the drawing:

Figure 1 is a fragmentary section, in elevation of a saw, looking towards one face of the latter and showing the form of the cutting unit, in accordance with this invention, Figure 2 is a top plan view of the structure illustrated by Figure 1, Figure 3 is a section on line 3—3, Figure 1, and Figure 4 is a fragmentary view upon an enlarged scale of the upper portion of the raker teeth of a saw.

The saw, generally indicated at 5, includes a body part 6 of the desired length, width and thickness. The outer lengthwise edge of the body part 6 is indicated at 7 and is squared. Integral with and extended from the inner lengthwise edge of body part 6 will be a number of the endwise aligned like cutting units, only one of which is shown and indicated generally at 8.

The unit 8 includes a base portion 9 which merges into the inner lengthwise edge of said body part 6, three spaced sets of spaced cutting teeth and two spaced pairs of spaced raker teeth. The cutting teeth and raker teeth extend outwardly from and are integral with the base portion 9. The number of cutting teeth of each set will preferably be four and are so shown. The cutting teeth of one set are indicated at 10, 11, 12 and 13. The cutting teeth of another set are designated at 14, 15, 16 and 17 and the cutting teeth of the other set are indicated at 18, 19, 20 and 21. The teeth of one pair of raker teeth are designated 22 and 23 and the teeth of the other pair of raker teeth are designated 24 and 25. The cutting tooth 13 opposes and is spaced from the raker tooth 22. The cutting tooth 14 aligns with and is spaced from the raker tooth 23. The cutting tooth 17 opposes and is spaced from the raker tooth 24. The cutting tooth 18 opposes and is spaced from the raker tooth 25. The cutting teeth 10, 11, 12 and 13 are termed an outer set of cutting teeth. The cutting teeth 18, 19, 20 and 21 are termed a second outer set of cutting teeth and the cutting teeth 14, 15, 16 and 17 are termed a central set of cutting teeth.

The raker teeth 22, 23 are arranged between the central set and the first outer set of cutting teeth. The raker teeth 24, 25 are arranged between the central set and the second outer set of cutting teeth.

The outer portions of the following side edges of the teeth 10, 11, 12, 13 are curved towards the left. The outer portions of the following side edges of the teeth 14, 15 are curved towards the left. The outer portions of the following side edges of the teeth 16, 17 are curved towards the right. The outer portions of the following edges of the teeth 18, 20 are curved towards the left. The outer portions of the following side edges of the teeth 19, 21 are curved towards the right. The outer portions of the following side edges of the teeth 22, 24 are curved towards the left and the outer portions of the following side edges of the teeth 23, 25 are curved towards the right.

The outer portions of the leading side edges of teeth 10, 11, 12 and 13 are directed towards the right and such portions are of less length than the curved outer portions on the following side edges of such teeth. The outer portions of the leading side edges of the teeth 14, 15 are directed towards the right and are of less length than the curved portions on the following side edges of such teeth. The outer portions of the leading side edges of the teeth 16, 17 are directed toward the left and are of less length than the curved portions on the follower side edges of such teeth. The outer portions of the leading side edges of the teeth 18, 20 are directed towards the right and are of less length than the curved portions on the following side edges of such teeth. The outer portion of the leading side edges of the teeth 19, 21 are directed towards the right and are of less length than the curved portions on the following side edges of such teeth.

The inner portions of the side edges of the teeth 10, 11, 12, 14, 15, 16, 18, 19 and 20 are straight. The inner portions of the following side edges of the teeth 17 and 21 and the leading side edge of tooth 13 are straight. The leading side edges of the teeth 17 and 21 and the following side edge of tooth 13 have straight intermediate portions 26 and curved inner portions 27 directed towards the right.

The leading side edges of the teeth 22, 24 have straight outer portions 28 and curved inner portions 29 directed towards the left. The following side edges of the teeth 22, 24 have straight inner portions 30. The leading side edges of the teeth 23, 25 have straight outer portions 31 and curved inner portions 32 directed towards the right.

The base 9 is formed with concave edge portions 33, 34, 35, 36, 37, 38, 39, 40, 41, 42, and 43 of like radii, and concave edge portions 44, 45, 46 and 47 of like radii, but of greater radii than any one of the said other concave edge portions. The following side edge of tooth 10 and leading side edge of tooth 11 merge into edge portion 33 to form a gullet 48. The following side edge of tooth 11 and leading side edge of tooth 12 merge into edge portion 34 to form a gullet 49. The following side edge of tooth 12 and leading side edge of tooth 13 merge into edge portion 35 to form a gullet 50. The following side edge of tooth 22 and the following side edge of tooth 23 merge into edge portion 36 to form a gullet 51. The following side edge of tooth 14 and the leading side edge of tooth 15 merge into edge portion 37 to form a gullet 52. The following side edge of tooth 15 and the following side edge of tooth 16 merge into the edge portion 38 to form a gullet 53. The leading side edge of tooth 16 and the following side edge of tooth 17 merge into edge portion 39 to form a gullet 54. The following side edge of tooth 24 and the follower side edge of tooth 25 merge into edge portion 40 to form a gullet 55. The following side edge of tooth 18 and the following side edge of tooth 19 merge into edge portion 41 to form a gullet 56. The leading side edge of tooth 19 and the leading side edge of tooth 20 merge into edge portion 42 to form a gullet 57. The following side edge of tooth 20 and the following side edge of tooth 21 merge into the edge portion 43 to form a gullet 58.

The following side edge of tooth 13 and the leading side edge of tooth 22 merge into edge portion 44 to form a gullet 59. The leading side edge of tooth 23 and the leading side edge of tooth 14 merge into edge portion 45 to form a gullet 60. The leading side edge of tooth 17 and the leading side edge of tooth 24 merge into edge portion 46 to form a gullet 61. The leading side edge of tooth 25 and the leading side edge of tooth 18 merge into edge portion 47 to form a gullet 62.

The bases of the gullets 48, 49, 50, 51, 52, 53, 54, 55, 56, 57 and 58 are positioned at the bases of the teeth. The bases of the gullets 59, 60, 61 and 62 extend below the bases of the teeth 13, 22, 23, 14, 17, 24, 25 and 18. The gullets 59, 60, 61 and 62 are of like width and depth and are each of materially greater width and slightly greater depth than any one of the other gullets. The outer portion of the gullets 51 or 55 is uniformly flared by the oppositely curving of the opposed following edges of a pair of raker teeth. The open ends of the gullets 51, 55 are of greater width than the open ends of the gullets formed between the cutting teeth. The inner portions of the gullets between the cutting teeth correspond in width and also correspond in width to the width of the inner portions of the gullets formed between the raker teeth.

Each raker tooth has the outer end of one side edge disposed in close proximity to the outer end of its other side edge. Formed integral with the aforesaid ends is a curved extension 63 constituting a raker blade. The extensions 63 on the raker teeth 22, 24 are directed to the left. The extensions 63 on the raker teeth 23, 25 are directed to the right. In other words, the extensions 63 on the teeth of a pair of raker teeth are disposed in opposite directions. These extensions materially assist in the raking operation provided by the teeth 22, 23, 24 and 25 and will provide for cleaning the kerf when the saw is operated in opposite directions.

The outer end portions of the cutting teeth are beveled to form cutting edges. The bevels on the teeth 10, 12, 14, 16, 18 and 20 are on that side of such teeth opposite the side on which the bevels are arranged on the teeth 11, 13, 15, 17, 19, 21. The cutting and raker teeth are of uniform length and their outer termini and bases align.

What I claim is:

In a saw, a body part and a cutting unit formed of a base integral with said body part, an outer, a central and a second outer set of spaced cutting teeth extended from said base, a pair of spaced raker teeth extended from said base between said first outer and said central sets of teeth, a second pair of spaced raker teeth extended from said base between said second outer and said central sets of teeth, the teeth of each set of teeth having gullets arranged therebetween, the raker teeth of each pair having a gullet arranged therebetween, the bases of the gullets between said raker teeth aligning with the bases of the gullets between said teeth in said sets, said first pair of raker teeth and said first outer set of teeth having a gullet therebetween, said central set of teeth and said first pair of raker teeth having a gullet arranged therebetween, said central set of teeth and said second pair of raker teeth having a gullet arranged therebetween, said second pair of raker teeth and said second outer set of teeth having a gullet arranged therebetween, said cutter and raker teeth being of a uniform length and having their outer ends aligned, the gullets between said sets of teeth and pairs of raker teeth being of a greater depth than said gullets between said cutting teeth and said gullets between said raker teeth, each raker tooth of each pair having extended from its outer end a rake blade, the rake blades of the raker teeth of each pair being disposed at an angle relative to the teeth and extending outwardly in opposite directions, the base of the gullets between the cutting teeth being aligned with the gullets between the raker teeth and disposed above those gullets between the raker pair and the cutting teeth sets and each tooth of the cutting teeth sets having its cutting edge beveled away from the direction of cut and having its following edge curved toward the direction of cut, said first outer set of teeth having each of its teeth arranged to cut in a single direction and said central and said second outer sets of teeth having half of their teeth arranged to cut in one direction and half to cut in the opposite direction.

MATT JOHNSON.